United States Patent Office 3,227,406
Patented Jan. 4, 1966

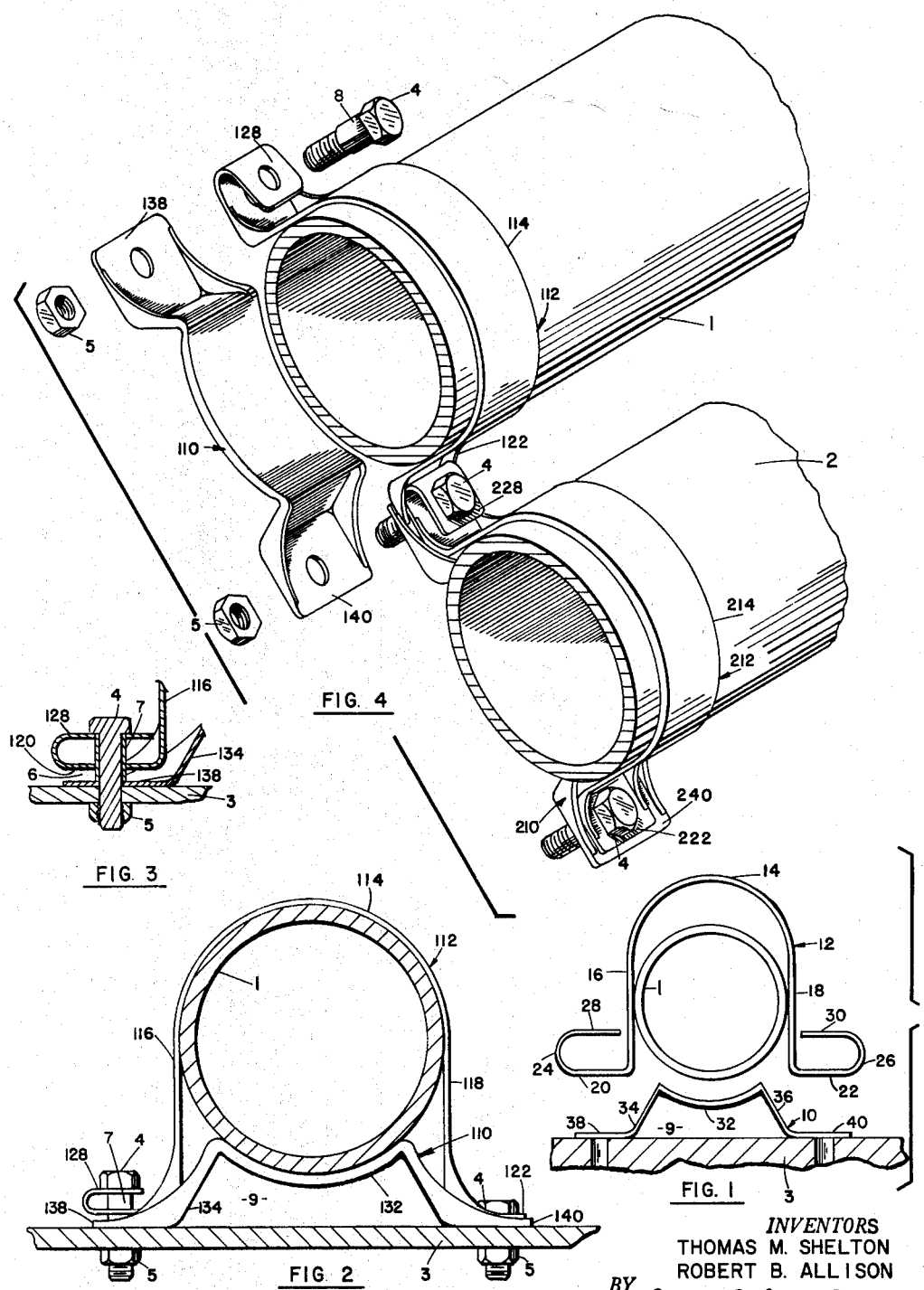

3,227,406
HIGH TEMPERATURE CLAMP AND METHOD OF MAKING SAME
Thomas M. Shelton, Glendale, and Robert B. Allison, Claremont, Calif., assignors to North American Aviation, Inc.
Filed July 15, 1963, Ser. No. 296,419
8 Claims. (Cl. 248—54)

This invention concerns a clamp or bracket such as may be used in containing and supporting cables, conduits, tubes or the like. More particularly, this invention relates to such a device for use in a high temperature environment.

Although the invention is of wide applicability in securing a variety of diverse generally elongate elements against movement, it will be described for purposes of illustration in connection with conduits and cables used in the fabrication of ultra high speed aerial and space vehicles. It will be understood that the scope of the inventive concept is in no sense limited by any of the specific details used to explain the invention, except as determined by reference to the accompanying claims.

Vehicles of the stated type, whether manned or not, are characterized by highly complex electronic and fully automatic systems for performing most of the guidance and control functions incident to flight or other movement through space. Due to the extreme criticality of size and weight limitations in the vehicles mentioned, the compactness and crowded internal conditions resulting from such equipment severely limit the permissible arrangements and clamping means used in securing wires, cables and conduits against movement or vibration. Moreover, the problem of securing the stated elements is additionally complicated by high compartment temperatures in vehicles such as referred to above, resulting both from external heating effects such as skin friction and from internal heating due to operation of electrical equipment and the engine or other source of power. In addition to these factors, the sub-zero temperatures of fluids contained within some of the lines in modern vehicles of the class mentioned, such as −400° F. or lower in the case of liquid hydrogen, is a necessary consideration in the search for securing means suitable for use with such lines. Of further importance in the stated problem situation is the fact that line clamps are necessarily affixed to the vehicle frame and are therefore affected by deflections in the frame such as would tend to loosen, distort or otherwise adversely affect the clamp, its mounting provisions with respect to the vehicle frame, or the line held by the clamp. Deflections of the fuselage and wing structure in vehicles of the stated class are frequently encounted due to aerodynamic and inertia loads imposed on the vehicle during its operation.

Of the various tube, wiring and conduit clamps known to the prior art, most are unsuitable for use in high temperature environment or exposure to low temperatures of the clamped element, and are too complex in design for economical manufacture or compact interfitting relationship where several such clamps are necessary in a narrowly confined area. Where the materials in a conventional clamp are capable of withstanding high temperatures, and are sufficiently thick to provide sufficient initial clamping stress, excess rigidity results so that the vibration characteristics of the clamp usually are extremely poor in that continuous high frequency vibration tends to lessen the clamping force. In addition to this, if the area of bearing or contacting surface between the clamping component and the clamped tube or other component is unduly narrow or otherwise limited, the danger of structural failure of either the clamp or the clamped element, or both, is considerably aggravated due to the chafing, scoring or other friction effects occurring due to vibration of the assembled components.

Accordingly, it is a principal objection of this invention to provide an improved clamp for securing tube, wiring, conduits or the like against detrimental movement.

It is a further object of this invention to provide an improved clamp as set forth in the above object for use in environments characterized by extreme temperatures for prolonged periods.

It is also an object of this invention to provide an improved clamp as set forth in the above object for use in securing elements in environments characterized by prolonged vibration at diverse frequencies and amplitudes.

It is a further object of this invention to provide a clamp as set forth in the above objects characterized by simplicity of form and lightness of weight.

It is a further object of this invention to provide a clamp as set forth in the above objects which is capable of manufacture with improved rapidity and economy.

It is an additional object of the invention in this case to provide a clamp as set forth in the above objects including means for automatically compensating for changes in position of the clamped object or the surface to which the clamp is secured, so that tightness of the clamping fit is continuously maintained.

It is a further object of this invention to provide a clamp as set forth in the above objects having improved strength in high temperature environments and while clamping low temperature lines.

Other objects and advantages of the instant invention will become apparent upon a close reading of the following detailed description of an illustrative embodiment of the invention, reference being had to the accompanying drawings, wherein:

FIGURE 1 shows a front elevational view of a clamp made in accordance with the teachings of this invention, FIGURE 2 shows a front elevational view of another clamp made in accordance with the teachings of this invention, FIGURE 3 shows a cross-sectional view taken through the center of the left-hand attaching bolt of FIGURE 2 in a plane parallel to the surface of the drawing, and FIGURE 4 shows an exploded view in perspective of two adjacent clamps such as shown in FIGURE 2 illustrating the interfitting feature of the clamps.

With reference to the drawings described above, and particularly to FIGURE 1, the invention disclosed herein may be seen to include a clamp comprising two main cooperating members generally designated by reference numerals 10 and 12. The upper band or strap member 12 may be seen to consist of an arcuate or bearing portion 14 which forms a continuation of generally flat or straight portions 16 and 18 at each side thereof. Side portions 16 and 18 are provided with a bight at their lower ends at substantially right angles to form resiliently deformable means in the form of loops comprising lower straight portion 20, curved portion 24, and upper straight portion 28 on the left side, and corresponding structure on the right side numbered 22, 26, and 30, respectively.

Lower clamp member 10 may be seen from FIGURE 1 to consist of an arcuate saddle or bearing portion 32 at its mid-section integrally formed with flat supporting portions 34 and 36 generally upstanding at each side thereof, which are in turn bent at a suitable angle to form a bight resulting in tab portions 38 and 40, respectively. While saddle portion 32 is shown curved in FIGURE 1, it will be understood that lower clamp member 10 may be formed with portion 32 in the flat or straight condition before assembly, and then forced or deformed into the curved condition by the element supported by the clamp due to the force of the attaching bolts acting upon the assembled components. Similarly, curved portions 24 and 26 on upper clamp element 12 may be initially formed in a relatively flat condition, and then bent or deformed into the arcuate shape shown by FIGURE 1 when the clamp and conduit components are assembled and the attaching bolts are tightened. The element to be secured by clamping means 10 and 12, such as conduit 1 shown in FIGURE 1, may be initially cradled or supported by portion 32 while strap member 12 is placed over conduit 1 in alignment with saddle member 10 so that appropriate securing means such as tie-down bolts may be passed through holes penetrating items 20, 28 and 38 on the left side, and 22, 30 and 40 on the right side as seen in FIGURE 1, thereby securing clamp components 10 and 12 to each other and to fixed structure 3 shown in cross section.

The embodiment shown by FIGURE 1 may be economically fabricated from flat strips of suitable material having the requisite properties of resiliency and resistance to temperature extremes. such as various metals or metal alloys. For example, a flat strip of stainless steel having substantially uniform thickness and width may be bent or otherwise deformed to produce the shape shown for elements 10 and 12 in FIGURE 1. Alternatively, a clamp embodying the inventive concept in this case may take the form shown in FIGURES 2 through 4 inclusive, and be fabricated in various different ways such as by stamping from sheet stock.

The clamp shown by FIGURE 2 may be seen to consist of two members generally designated 110 and 112 broadly corresponding to elements 10 and 12 in the clamp shown by FIGURE 1. Upper or strap member 112 shown in FIGURE 2 includes arcuate portion 114 having side portions 116 and 118 on the left and right, respectively. In the embodiment shown by FIGURE 2, side strap portion 118 does not terminate in a loop, but instead is deformed at an appropriate angle such as 90°, to provide a flat tab portion 122 which bears against a contacting portion 140 of lower or saddle clamp element 110. On the left side of upper clamp member 112 as shown in FIGURE 2, straight portion 116 is deformed at its lower end to form resilient means in the form of a loop 128 corresponding in function and general form with the loops shown at either side of upper clamp member 12 shown by FIGURE 1.

Lower clamp member 110 in the embodiment of FIGURE 2 and corresponding generally with element 10 previously described in connection with FIGURE 1, may be seen to include arcuate or saddle portion 132 integrally joined with straight portions at either end terminating in tab portions 138 and 140 which bear against fixed structure 3 shown in cross-section. As set forth above in connection with FIGURE 1, conduit 1 shown in FIGURE 2 is cradled or supported in saddle 132 and is maintained in close contact therewith by force exerted upon the conduit by strap member 112. Member 112 is maintained in contacting relationship with conduit 1 by suitable securing means such as attaching bolts 4 threadedly engaged with holding nuts 5 in the manner shown by FIGURE 2. As in the clamp of FIGURE 1, curved portion 132 in the clamp of FIGURE 2 may be initially formed straight and later forced into the shape shown by FIGURE 2 upon assembly of items 1, 3, 4, 110 and 112 in operative relationship.

The resilient holding feature of the clamps shown both in FIGURES 1 and 2 function the same in each case, and is shown more specifically by FIGURE 3 in connection with the clamp of FIGURE 2. As shown by FIGURE 3, a gap 6 exists between portions 120 and 138 of the upper and lower clamp elements 112 and 110, respectively, after attaching bolts 4 having been torqued to a position of adequate tightness. Gap 6 results from the fact that side strap portion 116 is so dimensioned with respect to conduit 1 that with upper clamp element 112 snugly engaged with arcuate portion 114 in close contact with conduit 1, side portion 116 will not extend downwardly a sufficient distance to contact flattened end portion 138 of lower clamp element 110. Thus, with the clamp components engaged in operative relationship as shown in FIGURE 2, attaching bolts 4 are tightened to apply clamping force holding the clamp components to each other and to fixed structure 3 as shown.

As shown in FIGURES 2 and 3, for example, bolts 4 may be equipped with a sleeve or bushing 7 in which each bolt may be inserted during assembly of the clamp components in the relationship shown by the stated figures. The purpose of sleeve 7 is to transmit holding force from bolt 4 by a ridge means comprising the bottom shoulder of the sleeve 7 to tab 138 as shown in FIGURE 3, maintaining tab 138 in continual contact with the upper surface of structural element 3.

Alternatively, attaching bolt 4 may take the form of a shoulder bolt having a screw thread portion at its distal end of smaller diameter than the remaining portion of the bolt shank so that a ridge means consisting of a shoulder 8 for applying force to tab 138 results therefrom as shown in FIGURE 4. With the clamp, conduit, and related parts assembled as shown in FIGURES 2 and 3, for example, using attaching bolts with shoulders 8 such as shown in FIGURE 4, shoulder 8 on the attaching bolt will apply force to tab portion 138 in essentially the same manner that sleeve 7 applies force to the stated tab portion in the embodiment of FIGURES 2 and 3. The length of sleeve 7 in the arrangement of FIGURES 2 and 3, or the distance between the bolt head and shoulder 8 in the type of attaching bolt shown by FIGURE 4, limits the amount that bolt 4 may move downwardly in opposition to the force of upper loop portion 128, hence partially determines the amount of compressive force applied by the bolt head to the stated upper loop portion. When in an uncompressed disassembled condition the resilient arcuate loop 128 may be considered, in comparison with its compressed assembled state, as being formed with a shallow curvature. Ridge means comprising the bottom shoulder of the head of bolts 4 bearing against the top surface of loop 128 on the left end of upper member 112 apply force in a downward direction causing the stated loop to depress by an amount depending upon the resilient characteristics of the clamp material, the amount of force applied by the stated bolt, and the dimensions of the stated loop. The amount of force thus applied to the left end of upper clamp element 112 shown in FIGURE 2 thus restrains and secures conduit 1 against movement, and is applied by arcuate portion 114 to conduit 1 in a direction causing the stated conduit to be held tightly against saddle portion 132 of lower element 110.

FIGURE 4 shows two clamps such as shown by FIGURE 2 in operative relationship holding two conduits 1 and 2, serving to illustrate the interfitting relationship between the stated clamps when used in close juxtaposition. Thus, terminal end 122 of upper clamp member 112 is aligned under loop 228 of upper clamp member 212 with a single attaching bolt 4 passing through appropriate holes in both stated clamp elements and through additional holes in lower clamp elements 110 and 210.

In operation, the clamps disclosed herein provide extremely secure attachment means for lines, cables, conduits and the like, in environments characterized by extremes of temperature and by complex vibrations of diverse frequency and amplitude such as would cause loosening of conventional devices used for clamping such items. This improved result appears due in part to the resilient nature of the two main components of the clamp, such as upper member 12 and lower member 10, for example, shown in FIGURE 1, particularly as enhanced by the loop at each side of the upper clamp member 12. Thus, any displacement of conduit 1 shown in FIGURE 1 after assembly of the clamp components and tightening of the attaching bolts will be resisted by force applied against conduit 1 by upper member 12 or by lower member 10, depending upon the direction of such displacement, the amount of force thus applied depending upon the amount of the displacement. Similarly, in the clamp shown by FIGURE 2, resiliency in upper member 112 results primarily from a single loop 128 on one side only of the stated member rather than on both sides in the clamp of FIGURE 1. In the arrangement of FIGURE 2, as amplified in detail by FIGURE 3, if conduit 1 for any reason moves in a direction away from lower member 110, for example, such movement will be resisted by an oppositely directed force applied by upper member 112, the magnitude of which will increase by an amount commensurate with the extent of the stated movement. This increase in force applied to the conduit by member 112 results from distortion of the member primarily at the location of loop 128. In the stated example, distortion of the loop occurs due to upward pull on one side portion 116 when conduit 1 moves arcuate portion 114 of upper member 112 upwardly. Upward pull on side portion 116 applies force to loop 128 in a direction opposite from the clamping force of attaching bolt 4 which secures the clamp components 110 and 112 together on the left side of conduit 1 as shown in FIGURE 2. Thus, in the stated example, opposing forces are applied on the upper and lower surfaces of loop 128 by attaching bolt 4 and side portion 116, respectively, tending to raise flat portion 120 and move it upwardly toward the head of bolt 4, widening gap 6. This movement is permitted by the sliding fit between bolt 4 and the hole in portion 120 through which the bolt passes. However, such movement is resisted by the material in loop 128, particularly in the region of the arc at its left side as shown in FIGURE 2, and when the force causing the stated type of movement abates, the loop immediately returns to its normal undisturbed condition.

It is also an important feature of the inventive concept disclosed herein that the clamps shown in FIGURES 1 through 4 secure conduit 1 or other clamped elements in spaced relationship to the surface upon which the clamps are mounted. Thus, for example, a space 9 exists between arcuate portion 32 of lower member 10 and the surface of supporting structure 3 in FIGURE 1. Where the clamp is used in a high temperature location in which supporting structure 3 is at a high temperature, space 9 serves to isolate the clamped element, such as conduit 1 in FIGURE 1, from the heat of structure 3. Conversely, if the contents of conduit 1 were critically high or low in temperature, space 9 aids in isolating the effects of such temperature extremes from the clamp supporting structure 3. The discussion pertaining to space 9 in connection with FIGURE 1 is obviously applicable with equal force in respect to the clamps shown by FIGURES 2, 3 and 4.

While the particular details set forth above and in the drawings are fully capable of attaining the objects and providing the advantages herein stated, the precise methods and devices thus disclosed are merely illustrative and could be varied or modified to produce the same results without departing from the scope of the basic inventive concept as defined in the appended claims.

We claim:

1. In a clamp for holding a body in spaced relationship to a structural element; a first member of relatively thin strip form having a bearing surface at its mid-portion for contact with said body and formed with supporting side portions at either end thereof, said side portions each terminating in tab means, a second member of relatively thin strip form having a curved mid-portion conforming in shape to the contacting surface of said body while contained in said clamp and applying force to said body in a first direction tending to hold said body in close contact with said bearing surface of said first member, said mid-portion of said second member being formed with relatively flat side portions joining said mid-portion at either end thereof, at least one of said flat side portions being bent at the distal end thereof to form an open loop with relatively flat top and bottom portions on said loop and an arcuate portion therebetween, hole means through said top and bottom portions of said loop and through said tab means, and securing means through said hole means for securing said first and second members to each other in operative relationship with said body and said structural element, said hole means, said loop and said securing means permitting limited movement of said mid-portion of said second member in a second direction opposite from said first direction.

2. In a clamp for holding a generally elongate body in constant spaced relationship with a structural element; a first member of relatively thin strip form disposed transverse to the longitudinal axis of said body, said first member having a bearing surface at its mid-portion for contact with said body and formed with supporting side portions at either end thereof whereby said body is supported in spaced relationship with said element, a second member of relatively thin strip resilient form having a curved mid-portion conforming to the contacting surface of said body while contained in said clamp, said mid-portion of said second member being formed with relatively flat side portions joining said mid-portion at either end thereof, at least one of said flat side portions being bent at the distal end thereof to form an open loop with relatively flat top and bottom portions on said loop and a resilient arcuate portion therebetween, said loop being formed with shallow curvature of said resilient arcuate portion when said clamp is in the disassembled condition, hole means through said top and bottom portions of said loop and through said tab means, and securing means through said hole means for securing said first and second members to each other in operative relationship with said body and said structural elements, said securing means applying force to the said flat top portion on said loop causing deformation of said arcuate portion into a curve of relatively smaller radius than that characterizing said shallow curvature, said hole means and said securing means permitting limited relative movement of said second member with respect to said securing means and said first member, and the reaction force resulting from said deformation of said resilient arcuate portion being applied to said body by said second member in a direction tending to hold said body in close contact with said first member.

3. In a clamp for holding a body in constant spaced relationship to a structural element; a first member of relatively thin strip form having a bearing surface at its mid-portion for contact with said body and formed with supporting side portions at either end thereof, said side portions each terminating in tab means, said bearing portion being substantially flat when said clamp is in the unassembled condition, said bearing surface further being resiliently deformable upon the application of pressure thereto, a second member of relatively thin strip form having a curved mid-portion adapted to conform to the contacting surface of said body while contained in said clamp, said mid-portion of said second member being formed with relatively flat side portions joining said mid-portion at either end thereof, at least one of said flat side portions being relatively slightly bent at the distal end thereof to form a bight portion with relatively flat top and bottom portions and an arcuate portion therebetween, said arcuate portion being resiliently deformable upon the application of force on said top portion, hole means through said top and bottom portions of said bight portion and through said tab means, and securing means through said hole means for securing said first and second members to each other in operative relationship with said body and said structural element, said bight portion and said securing means permitting limited movement of said second member with respect to said first member, said securing means applying force to said top portion of said bight portion causing said arcuate portion to deform into a curve of relatively small radius, said deformation of said arcuate portion causing said second member to apply force to said body causing said bearing surface of said first member to deform into close conformity with the shape of said body, and said force offering increased resistance with each increase in the amount of said movement of said second member away from said first member.

4. A conduit clamp comprising a first strap having flat tab portions at each end thereof and a center portion adapted to contact a conduit supported by said clamp in spaced relationship from a structural surface, said first strap further having an upstanding side portion between said center portion and each of said tab portions whereby said center portion is situated in spaced relationship with said surface when both said tab portions contact said surface, said clamp further comprising a second strap of inverted U-shaped general form, said second strap having a loop at the lower distal end of one side portion and a substantially flat tab portion at the lower distal end of the other side portion adapted to contact one of said flat tab portions on said first strap, said loop having relatively flat top and bottom portions and an arcuate portion therebetween, and securing means extending through said flat top and bottom portions of said loop and through the other of said tab portions on said first strap, and through said contacting tab portions on said first and second straps to secure each of said lower distal ends on said second strap in operative relationship with said surface, said securing means through said flat top and bottom portions of said loop including first ridge means for applying force to said flat top portion of said loop and second ridge means for applying force to said tab portion on said first strap aligned with said loop to hold said flat top portion of said loop and said aligned tab portion on said first strap in relatively fixed mutual relationship, said securing means through said flat top and bottom portions of said loop further permitting limited movement of said flat bottom portion of said loop relative to said flat top portion of said loop whereby resiliency of said curved portion of said loop produces holding force applied by said second strap to said conduit.

5. A conduit clamp comprising a first strap having flat tab portions at each end thereof and a curved center portion adapted to contact a conduit supported by said clamp in spaced relationship from a structural surface, said first strap further having an upstanding side portion between said center portion and each of said tab portions whereby said center portion is situated in spaced relationship with said surface when both said tab portions contact said surface, and said clamp further comprising a second strap of inverted U-shaped general form, said second strap having a loop at the lower distal end of each side portion, said loops each having relatively flat top and bottom portions and an arcuate portion therebetween, securing means for holding said first and second straps in mutual operative relationship, said securing means permitting limited movement of said second strap relative to said first strap, said securing means extending through said flat top and bottom portions of said loop on said second strap, and through said tab portions on said first strap to secure each of said lower distal ends on said second strap in spaced relationship with one of said tab portions and to secure said tab portions to said surface whereby resiliency of said curved portion of said loop applies increased force to said second strap in response to said movement of said second strap relative to said first strap.

6. A conduit clamp comprising a first strap having flat tab portions at each end thereof and a curved center portion adapted to contact a conduit supported by said clamp in spaced relationship with a structural surface, said first strap further having upstanding side portions between said center portion and each of said tab portions whereby said center portion is situated in spaced relationship with said surface when contacted by both said tab portions, and said clamp further comprises a second strap of inverted U-shaped general form, said second strap having a loop at the lower distal end of one side portion and a substantially flat tab portion at the lower distal end of the other side portion adapted to contact one of said flat tab portions on said first strap, said loop having relatively flat top and bottom portions and an arcuate portion therebetween, securing means for holding said first and second strap in mutual operative relationship, said securing means permitting limited movement of said second strap relative to said first strap, said securing means extending through said flat top and bottom portions of said loop and through the other of said tab portions on said first strap, and through said contacting tab portions on said first and second straps to secure each of said lower distal ends on said second strap in operative relationship with said surface whereby resiliency of said curved portion of said loop applies increased force to said second strap in response to said movement of said second strap relative to said first strap.

7. A two-piece clamp comprising:
  an elongate first clamp member for supporting a clamped object in spaced relationship relative to a mounting surface, each end of said elongate first clamp member having a tab thereon,
  an elongate second clamp member for holding said object in operative relationship with said first clamp member while permitting movement of said object relative to said first clamp member, each end of said elongate second clamp member having a tab thereon,
  said second clamp member including resilient means for resiliently restraining said movement, and
  securing means for securing together said tabs at each end of said first clamp member with said tabs at each end of said second clamp member.

8. A two-piece clamp comprising:
  an elongate first clamp member having a mid-portion adapted to contact an object and to support said object in spaced relationship from a supporting surface,
  said first clamp member further having tab means at each extremity thereof,
  an elongate second clamp member having a mid-portion adapted to contact said object,
  said elongate second clamp member further having upstanding side portions adjoining said mid-portion on either end thereof,
  at least one of said side portions including a bight portion at the terminal end thereof,
  said bight portion including a resilient loop adapted to apply spring force to said mid-portion of said second clamp member when said loop is deformed by compression load externally applied thereto, said spring force permitting restrained movement of said object relative to said first clamp member, and
  securing means for securing said side portions of said second clamp member to said first clamp member and holding said first and second clamp members in operative relationship with said object and said supporting surface,
  said securing means including means for applying said compressive load to produce said spring force.

References Cited by the Examiner

UNITED STATES PATENTS

| | | | |
|---|---|---|---|
| 539,462 | 5/1895 | Weiant | 248—74 |
| 1,616,176 | 2/1927 | Bremer | 248—358.1 |
| 2,172,004 | 9/1939 | Anderson | 248—24 |
| 2,451,658 | 10/1948 | Bugatti | 24—125 |

FOREIGN PATENTS

| | | |
|---|---|---|
| 732,157 | 6/1932 | France. |
| 5,891 | 3/1909 | Great Britain. |

CLAUDE A. LE ROY, *Primary Examiner.*